United States Patent
Bundren et al.

(10) Patent No.: US 9,038,966 B2
(45) Date of Patent: May 26, 2015

(54) SIDE-LOADING QUADRANT DEADEND CLAMP ASSEMBLY

(75) Inventors: Jason L. Bundren, Leeds, AL (US); Seydou Diop, Birmingham, AL (US); Paul F. Zelazny, Moody, AL (US)

(73) Assignee: Hubbell Incorporated, Shelton, CT (US)

( * ) Notice: Subject to any disclaimer, the term of this patent is extended or adjusted under 35 U.S.C. 154(b) by 137 days.

(21) Appl. No.: 13/248,259

(22) Filed: Sep. 29, 2011

(65) Prior Publication Data

US 2013/0082152 A1  Apr. 4, 2013

(51) Int. Cl.
*F16L 3/00* (2006.01)
*F16L 3/08* (2006.01)
*F16G 11/06* (2006.01)
*H02G 7/05* (2006.01)

(52) U.S. Cl.
CPC ...................................... *H02G 7/056* (2013.01)

(58) Field of Classification Search
USPC .......................................................... 248/63
See application file for complete search history.

(56) References Cited

U.S. PATENT DOCUMENTS

| | | | | |
|---|---|---|---|---|
| 294,746 | A | * | 3/1884 | Straup et al. ..................... 16/330 |
| 984,134 | A | * | 2/1911 | Gilbert ........................... 411/197 |
| 1,215,201 | A | | 2/1917 | Sandford, Jr. |
| 1,730,197 | A | | 10/1929 | Elsey |
| 1,858,549 | A | | 5/1932 | Jenner |
| 1,936,097 | A | * | 11/1933 | Noyes .......................... 24/135 A |
| 2,196,938 | A | | 4/1940 | Parnell |
| 2,471,305 | A | | 5/1949 | Card |
| 2,631,805 | A | * | 3/1953 | Jackson ...................... 248/316.5 |
| 2,635,133 | A | | 4/1953 | Badeau |
| 2,640,667 | A | * | 6/1953 | Winn ............................... 248/65 |
| 2,669,600 | A | | 2/1954 | Bergan |
| 2,810,116 | A | * | 10/1957 | Webster et al. ............... 439/472 |
| 2,810,538 | A | * | 10/1957 | Anderson ........................ 248/63 |
| 2,942,316 | A | * | 6/1960 | McHorse ..................... 24/135 A |
| 2,950,936 | A | * | 8/1960 | Gunthel, Jr. ................... 403/178 |
| 2,980,378 | A | | 4/1961 | Bethea |
| 2,997,764 | A | | 8/1961 | Lantz |
| 3,205,522 | A | * | 9/1965 | Then ............................... 15/146 |
| 3,383,459 | A | * | 5/1968 | Short ............................ 174/144 |
| 3,512,565 | A | * | 5/1970 | Zezza ............................ 411/318 |
| 4,278,226 | A | * | 7/1981 | Horowitz ...................... 248/314 |
| 4,330,906 | A | | 5/1982 | Werner |
| 4,383,668 | A | | 5/1983 | Hall |
| 4,707,051 | A | | 11/1987 | Hall |
| 4,817,682 | A | * | 4/1989 | Williams ....................... 140/113 |
| 4,969,616 | A | | 11/1990 | Apperson |
| 4,974,888 | A | * | 12/1990 | Childers ....................... 292/251 |
| 5,207,543 | A | | 5/1993 | Kirma |
| 5,435,507 | A | * | 7/1995 | Murphy ....................... 248/74.4 |
| 5,752,680 | A | | 5/1998 | Mann |

(Continued)

OTHER PUBLICATIONS

International Search Report and Written Opinion for PCT/US2012/055453 dated Dec. 10, 2012.

*Primary Examiner* — Joshua J Michener
*Assistant Examiner* — Chiedu Chibogu
(74) *Attorney, Agent, or Firm* — Michael Best & Friedrich, LLP (57) ABSTRACT

A clamp assembly includes a body member having a cable groove formed therein to receive a cable. A keeper is connected to the body member and has a lower surface adapted to engage the cable received in the cable groove. A biasing member is disposed between the keeper and the body member.

18 Claims, 10 Drawing Sheets

(56) References Cited

U.S. PATENT DOCUMENTS

| | | | |
|---|---|---|---|
| 5,794,897 A * | 8/1998 | Jobin et al. | 248/74.4 |
| 5,893,538 A * | 4/1999 | Onishi et al. | 248/65 |
| 5,941,483 A * | 8/1999 | Baginski | 248/68.1 |
| 6,113,039 A * | 9/2000 | Riffle | 248/75 |
| 6,128,800 A * | 10/2000 | Vosbikian | 15/172 |
| 6,161,982 A * | 12/2000 | Cole | 403/97 |
| 6,327,753 B1 | 12/2001 | Rushing | |
| 6,595,472 B1 * | 7/2003 | Pisczak | 248/74.1 |
| 7,010,822 B1 * | 3/2006 | Lin | 7/143 |
| 7,039,988 B2 | 5/2006 | De France | |
| 7,316,533 B2 * | 1/2008 | Tanimura | 411/119 |
| 7,562,848 B2 | 7/2009 | Tamm | |
| 2005/0015940 A1 | 1/2005 | Stafford | |

\* cited by examiner

SIDE-LOADING QUADRANT DEADEND CLAMP ASSEMBLY

FIELD OF THE INVENTION

The present invention relates to a clamp assembly for deadending a conductor. More particularly, the present invention relates to a clamp assembly having a biasing member disposed between a keeper and body member of the clamp assembly. Still more particularly, the present invention relates to a clamp assembly in which a conductor is secured between a keeper and body member, and a biasing member is disposed on a fastener securing the keeper to the body member.

BACKGROUND OF THE INVENTION

Deadend clamps are commonly used to secure a cable under tension, for example, an overhead electrical conductor. The deadend clamp anchors the received cable to a supporting structure, such as a tower or utility pole. The deadend clamp transmits the tension on the cable to the supporting structure.

Conventional deadend clamps typically include one or more U-bolts to clamp a keeper, which in turn applies a clamping pressure to the conductor, such as the deadend clamp disclosed in U.S. Pat. No. 5,752,680. One disadvantage associated with such deadend clamps is that the lineman must remove several nuts and washers to insert the conductor, and then the nuts and washers must be reconnected to the U-bolts. That procedure becomes even more difficult when the lineman is working with an energized conductor in the field. Accordingly, a need exists for a clamp assembly that is easily assembled.

Another disadvantage associated with conventional deadend clamps is the use of non-captive fasteners to secure the keeper to the main body. Non-captive fasteners are prone to loosening, thereby providing a less secure connection between the keeper and the main body. Accordingly, a need exists for a clamp assembly in which the keeper is securely connected to the main body to maintain clamping pressure on the conductor.

Still another disadvantage associated with conventional deadend clamps the use of external springs between the keeper and the main body. These springs can become dislodged when tightening the keeper to the main body. Additionally, these springs require the fasteners to be tightened in a specific sequence to prevent damaging the springs, thereby providing an inefficient and time consuming task for the lineman. Accordingly, a need exists for a clamp assembly having an improved biasing member between the keeper and main body.

SUMMARY OF THE INVENTION

Accordingly, it is a primary objective of the present invention to provide a clamp assembly that is easy to assemble.

A further objective of the present invention is to provide a clamp assembly in which a keeper is securely connected to a main body.

Another objective of the present invention is to provide a clamp assembly in which a biasing member is securely maintained between a keeper and a main body.

The foregoing objectives are basically attained by a clamp assembly that includes a body member having a cable groove formed therein to receive a cable. A keeper is connected to the body member and has a lower surface adapted to engage the cable received in the cable groove. A biasing member is disposed between the keeper and the body member.

The foregoing objectives are also basically attained by a clamp assembly including a body member and a keeper. A cable groove is formed in the body member to receive a cable. The keeper has a lower surface adapted to engage the cable received in the cable groove. A threaded fastener connects the keeper to the body member. An internally threaded nut disposed in a chamber in the keeper receives the fastener. A biasing member is disposed on the fastener.

Other objects, advantages and salient features of the invention will become apparent from the following detailed description, which, taken in conjunction with the annexed drawings, discloses a preferred embodiment of the invention.

As used in this application, the terms "front," "rear," "upper," "lower," "upwardly," "downwardly," and other orientational descriptors are intended to facilitate the description of the clamp assembly, and are not intended to limit the structure of the clamp assembly to any particular position or orientation.

BRIEF DESCRIPTION OF THE DRAWINGS

The above aspects and features of the present invention will be more apparent from the description for an exemplary embodiment of the present invention taken with reference to the accompanying drawings, in which.

Throughout the drawings, like reference numerals will be understood to refer to like parts, components and structures.

DETAILED DESCRIPTION OF EXEMPLARY EMBODIMENTS

As shown in FIGS. 1-19, a clamp assembly 11 includes a body member 21 and a keeper 31. The body member 21 has a cable groove 71 formed therein to receive a cable 9. The keeper 31 is connected to the body member 21 and has a lower surface 34 adapted to engage the cable 9 received in the cable groove 71. A biasing member 41 is disposed between the keeper 31 and the body member 21.

Figure 1:
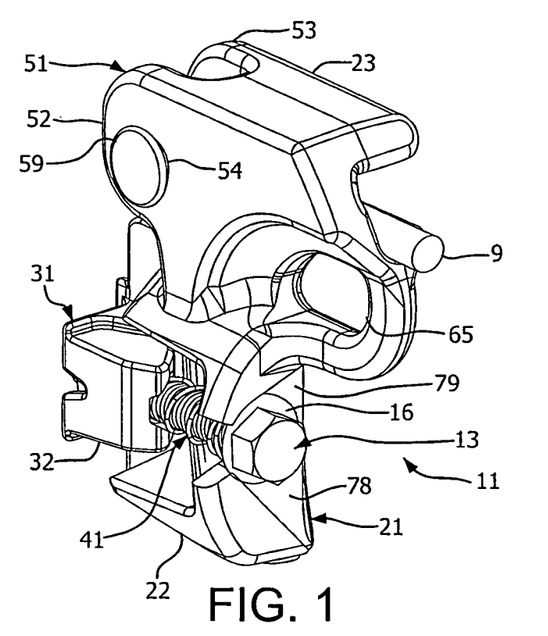
FIG. 1 is a front perspective view of a side loading quadrant deadend clamp assembly according to an exemplary embodiment of the present invention.
Figure 2:
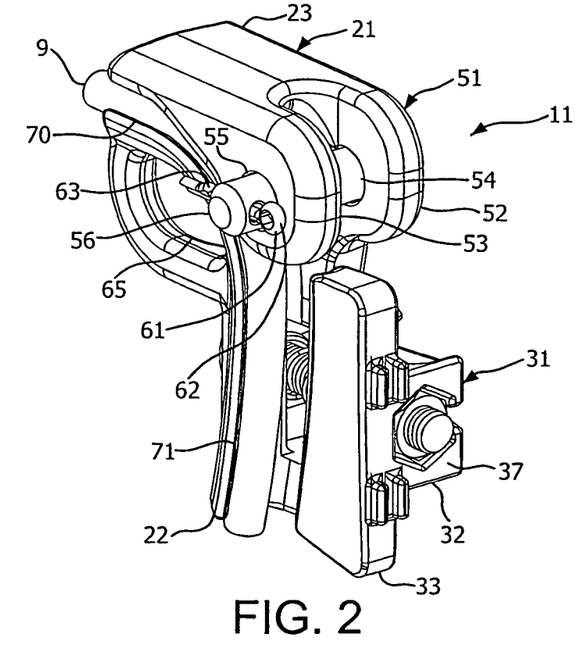
FIG. 2 is a rear perspective view of the clamp assembly of FIG. 1.
Figure 4:
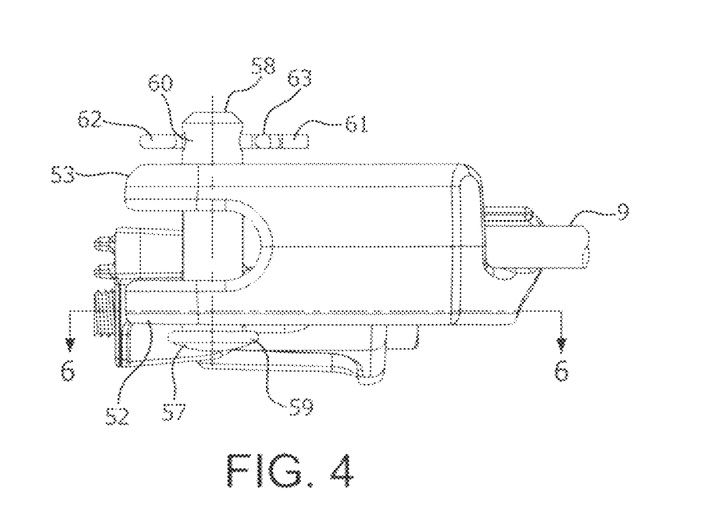
FIG. 4 is a top plan view of the clamp assembly of FIG. 1.

The body member 21 includes a clevis bracket 51 having first and second mounting ears 52 and 53, as shown in FIGS. 1 and 2. Openings 54 and 55 in the mounting ears 52 and 53 receive a clevis pin 56. As shown in FIG. 4, the clevis pin 56 has a first end 57 and a second end 58. A head 59 is disposed at the first end 57 of the clevis pin. An opening 60 is formed proximal the second end 58 of the clevis pin 56. The second end 58 of the clevis pin 56 is inserted through the first and second mounting ears 52 and 53. A cotter pin 61 is inserted through the opening 60 in the clevis pin 56, thereby preventing the clevis pin 56 from being removed from the mounting ears 52 and 53. The head 59 of the clevis pin 56 is larger than the openings 54 and 55 in the mounting ears 52 and 53 to limit insertion of the clevis pin through the openings 54 and 55 in the mounting ears. The cotter pin 61 has a head 62 at one end and a raised portion 63 proximal the other end to substantially prevent accidental withdrawal of the cotter pin from the clevis pin opening 60. The head 62 of the cotter pin 61 is larger than the clevis pin opening 60 to limit insertion of the cotter pin. The raised portion 62 of the cotter pin 61 flexes to allow insertion of cotter pin through the clevis pin opening 60, but prevents accidental withdrawal of the cotter pin from the clevis pin opening 60. The clevis bracket 51 allows the clamp assembly 11 to be pivotally connected to a supporting structure.

Figure 8:
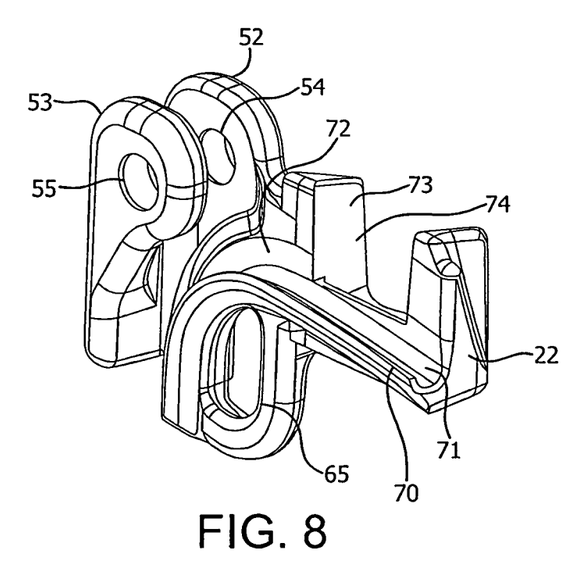
FIG. 8 is a bottom perspective of the body member of FIG. 7.
Figure 9:
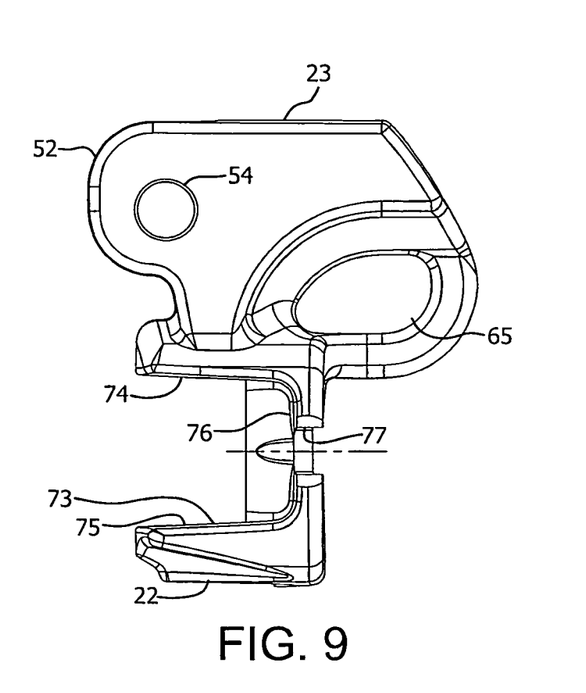
FIG. 9 is a side elevational view of the body member of FIG. 7.
Figure 10:
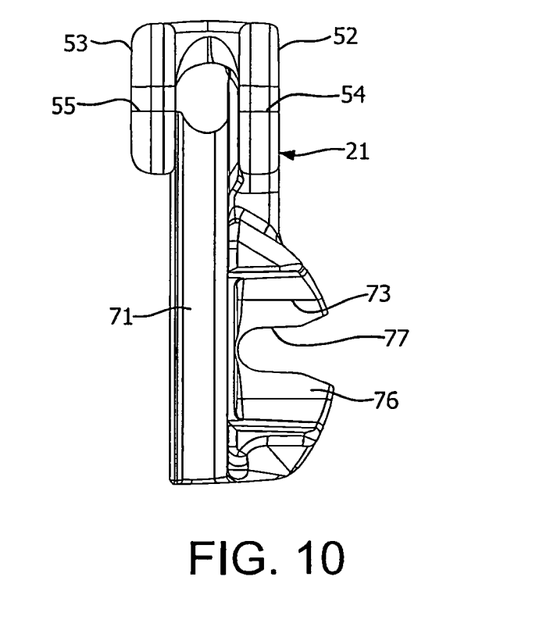
FIG. 10 is a rear elevational view of the body member of FIG. 7.
Figure 11:
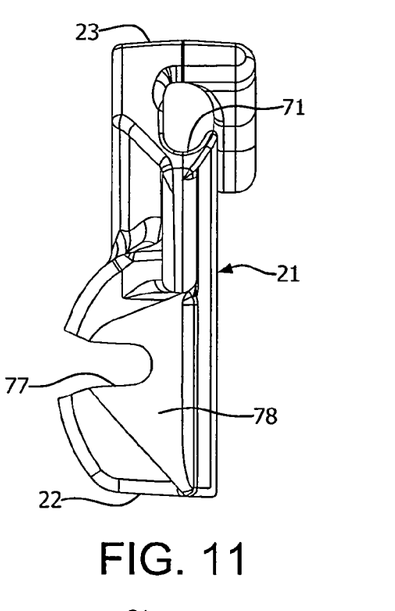
FIG. 11 is a front elevational view of the body member of FIG. 7.
Figures 12, 13:
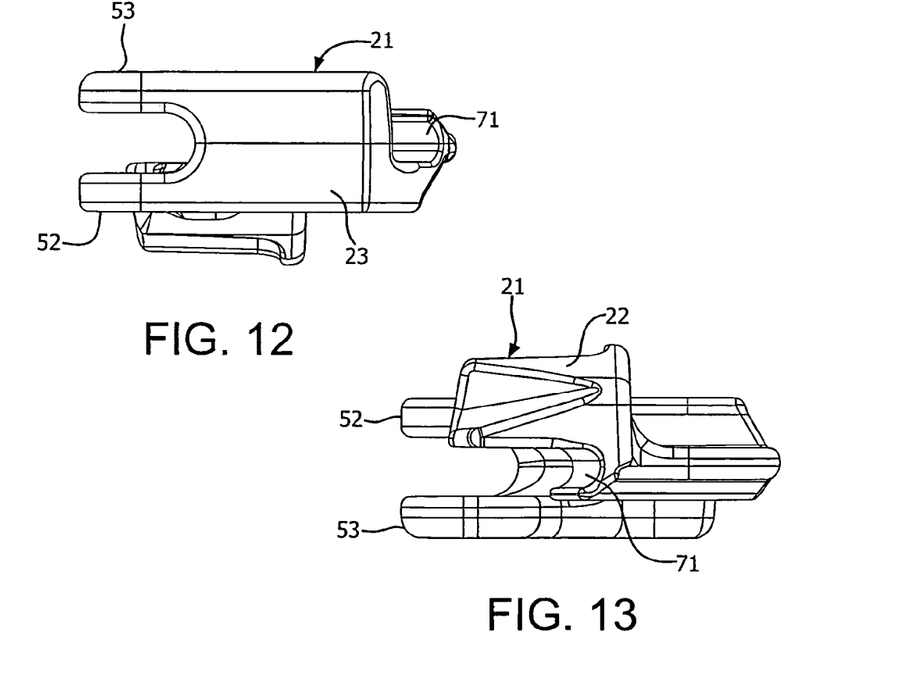
FIG. 12 is a top plan view of the body member of FIG. 7.
FIG. 13 is a bottom plan view of the body member of FIG. 7.
Figures 14, 15:
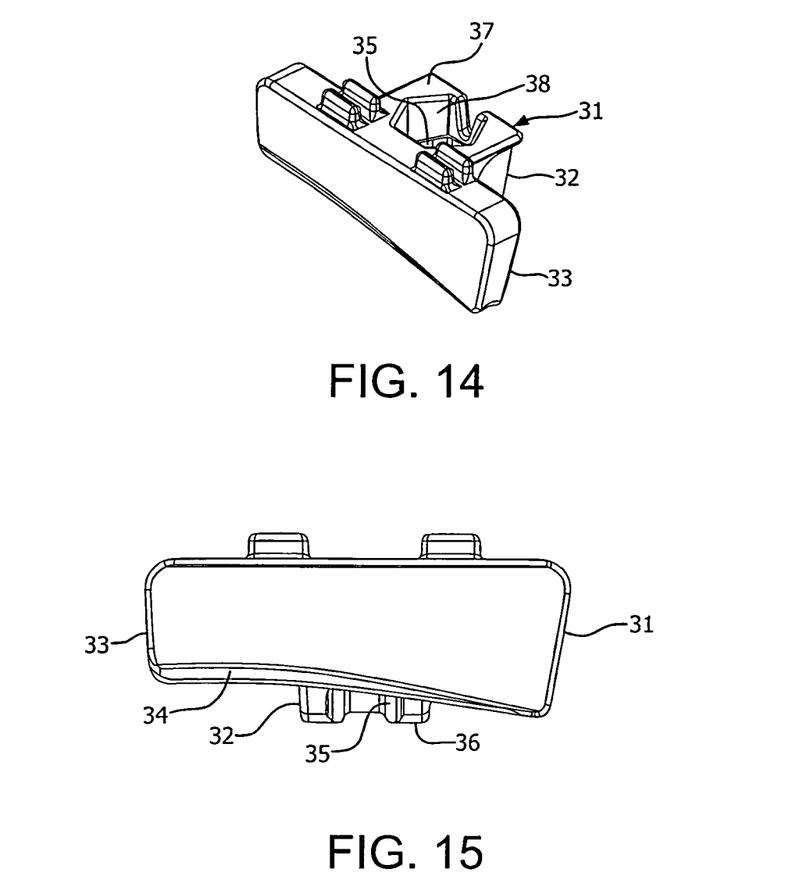
FIG. 14 is a perspective view of a keeper of the clamp assembly of FIG. 1.
FIG. 15 is a side elevational view of the keeper of FIG. 14.

A cable groove 71 extends from a first end 22 to proximal a second end 23 of the body member 21, as shown in FIG. 2. The cable groove 71 has a 90 degree bend 72 therein, as shown in FIG. 8, to bring the conductor 9 in line with the clevis bracket 51. The cable groove 71 is preferably formed in a side of the body member 21 such that the conductor 9 can be inserted in the cable groove in a radial direction of the conductor, i.e., from the side of the clamp assembly 11. A lip 70 is formed at an outer edge of the cable groove 71, as shown in FIGS. 2 and 8, to substantially prevent the cable 9 from exiting the cable groove 71 before being clamped between the body member 21 and the keeper 31.

Figure 3:
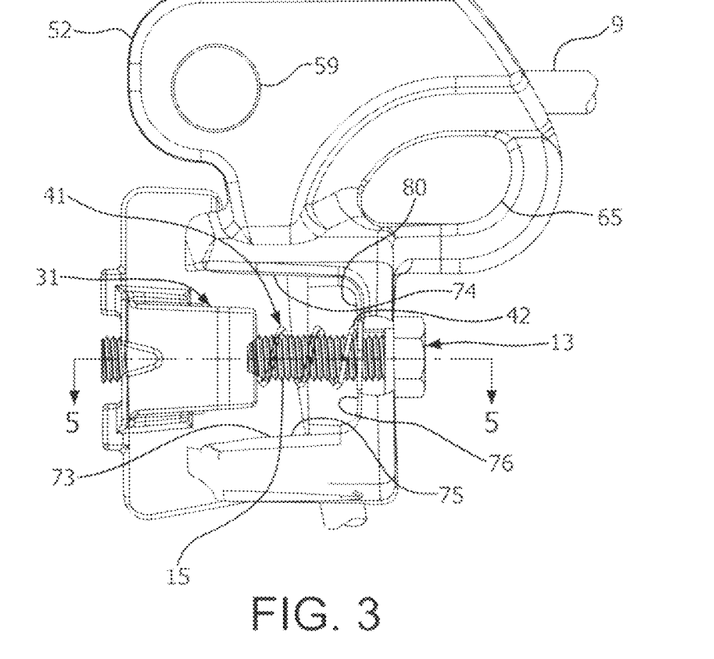
FIG. 3 is a side elevational view of the clamp assembly of FIG. 1.
Figure 6:
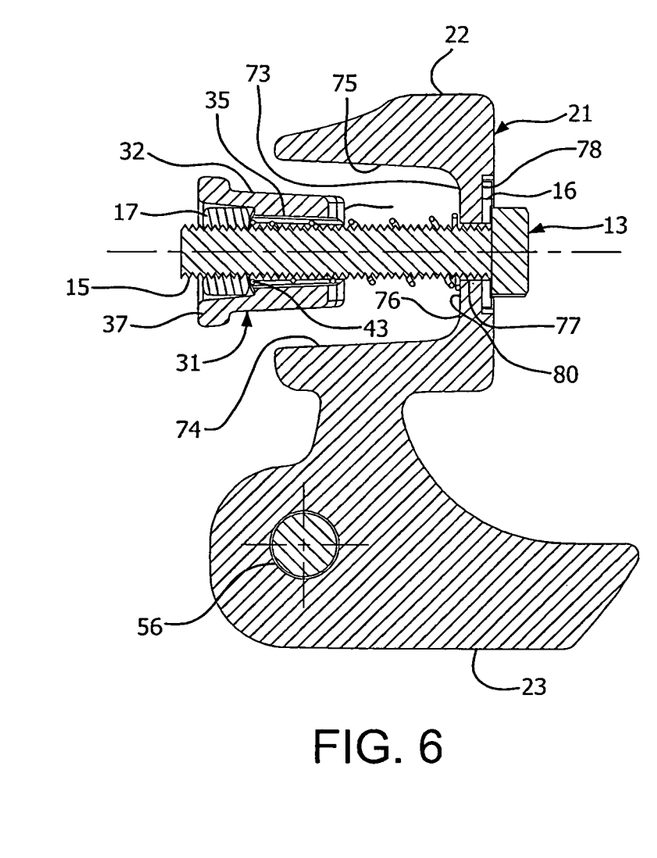
FIG. 6 is a side elevational in cross section of the clamp assembly taken along line 6-6 of FIG. 4.

As shown in FIG. 6, a pocket 73 is formed in the body member 21 proximal the first end 22 thereof. The pocket 73 is preferably a substantially U-shaped cavity configured to receive the keeper 31, as shown in FIG. 3. The pocket 73 has opposite side walls 74 and 75 and a bottom wall 76 therebetween. A fastener opening 77 in the bottom wall 76 of the pocket 73 receives a fastener 13 to secure the keeper 31 to the body member 21, as shown in FIG. 6.

Figure 7:
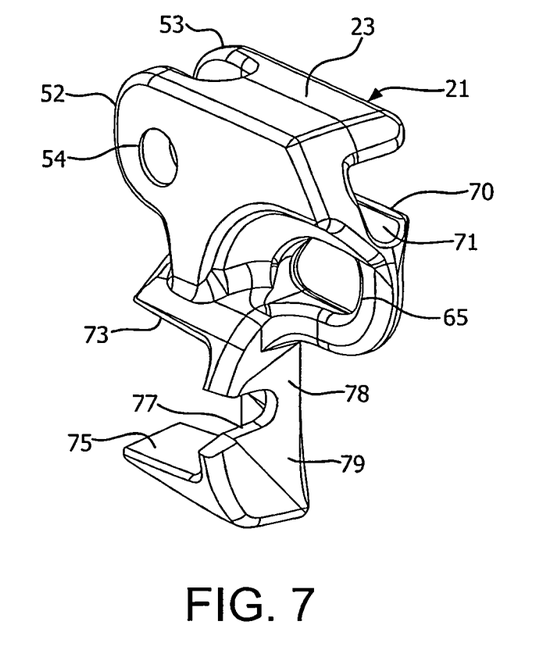
FIG. 7 is a front perspective view of a body member of the clamp assembly of FIG. 1.

A recessed area 78 is formed on an outer surface 79 of the bottom wall 76 of the pocket 73, as shown in FIG. 6. The recessed area 78 is preferably substantially V-shaped, as shown in FIG. 7. The recessed area 78 receives the washer 16 disposed on the shaft 15 of the fastener, as shown in FIG. 6.

Figure 5:
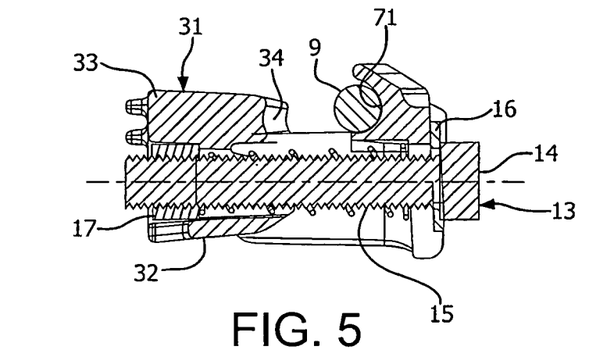
FIG. 5 is a top plan view in cross section of the clamp assembly taken along line 5-5 of FIG. 3.
Figure 16:
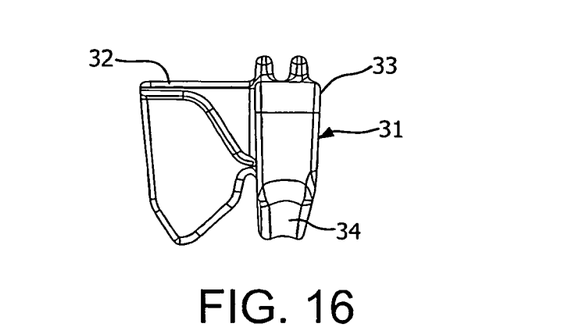
FIG. 16 is a rear elevational view of the keeper of FIG. 14.
Figure 17:
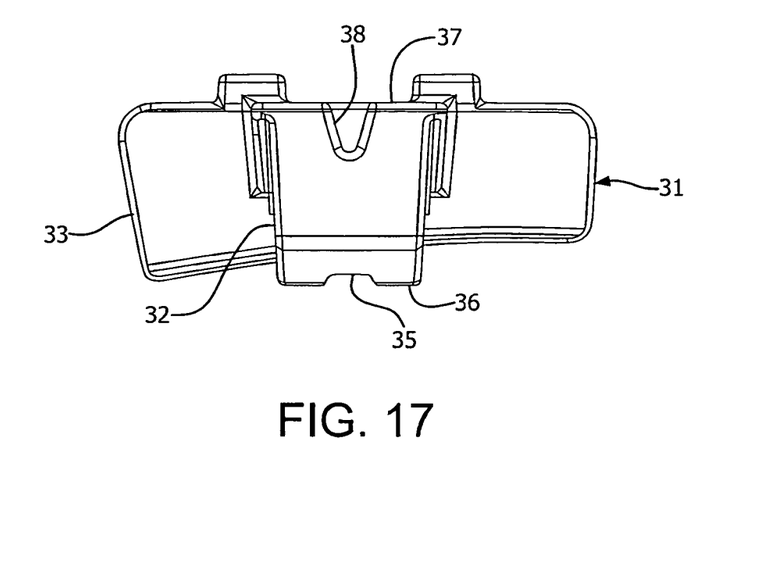
FIG. 17 is a side elevational view of the keeper of FIG. 14.
Figure 18:
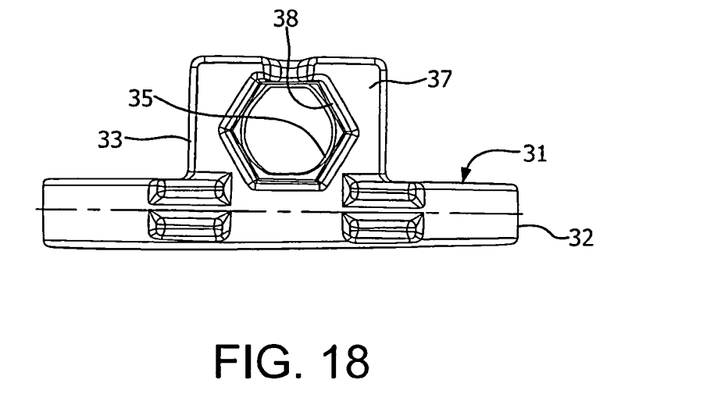
FIG. 18 is a top plan view of the keeper of FIG. 14.

The keeper 31 is secured to a side of the body member 21 below the clevis bracket 51, as shown in FIG. 2. The keeper 31 has a fastening portion 32 and a cable engaging portion 33, as shown in FIGS. 14-18. A cable groove 34 is disposed in the cable engaging portion 33 of the keeper 31, as shown in FIGS. 5 and 16. The keeper cable groove 34 is disposed opposite the body member cable groove 71 to securely retain the cable 9 therebetween when the keeper 31 is secured to the body member 21.

The fastening portion 32 of the keeper 31 has a fastener bore 35 or opening passing from an inner surface 36 to an outer surface 37 thereof, as shown in FIGS. 5 and 6. A chamber 38 is formed at the end of the bore proximal the outer surface 37 to receive a nut 17 disposed on the fastener 13. The chamber 38 is preferably hexagonally shaped to correspond to the outer shape of the nut 17, thereby providing a captive nut that is substantially prevented from rotational movement on the fastener 13.

An eye 65 in the body member 21 facilitates manipulation of the clamp assembly 11 by a lineman. Preferably, the eye 65 has a substantially oval shape. The cable groove preferably runs between the eye 65 and the mounting ears 52 and 53. Accordingly, the clevis pin 56 does not need to be removed to insert the conductor 9 in the cable groove 71.

The fastener 13 is inserted through a fastener opening 77 in the bottom wall 76 of the pocket 73 of the body member 21 and is received by a fastener bore 35 in the keeper 31. The fastener 13 has a head 14 and a threaded shaft 15 extending therefrom, as shown in FIGS. 5 and 6. The washer 16 and the nut 17 are disposed on the fastener shaft 13. When assembled, the washer 16 is received in the recess 78 in the body member 21 and the nut 17 is received in the chamber 38 in the fastener portion 32 of the keeper 31.

The biasing member 41 is disposed on the shaft 15 of the fastener 13, as shown in FIGS. 1-3, 5 and 6. The biasing member 41 has a first end 42 that abuts an inner surface 80 of the bottom wall 76, as shown in FIG. 3. A second end 43 of the biasing member 41 abuts the nut 17 received in the chamber 38 of the keeper 31, as shown in FIG. 6. The biasing member 41 is preferably a helical tapered spring in which a diameter at the first end 42 is larger than a diameter at the second end 43.

Figure 20:
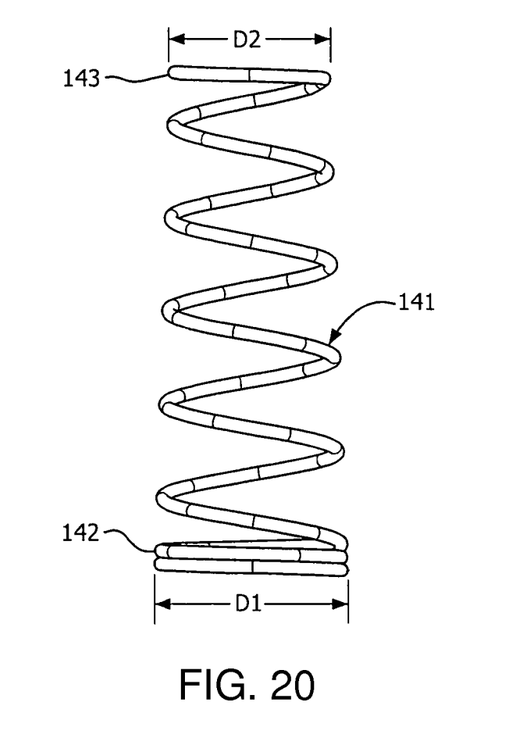
FIG. 20 is a front elevational view of a biasing member of the clamp assembly of FIG. 1.
Figure 21:
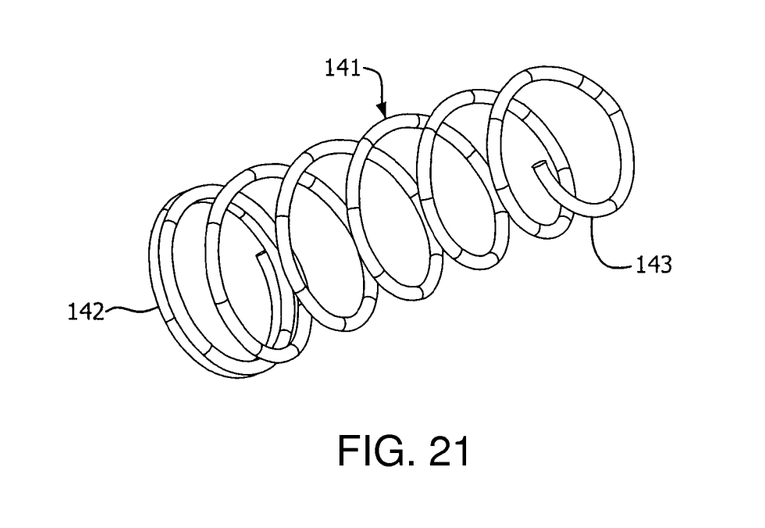
FIG. 21 is a perspective view of the biasing member of FIG. 20.

The helical tapered spring 141 has a first diameter D1 at a first end 142 larger than a second diameter D2 at a second end 143, as shown in FIGS. 20 and 21. The first end 142 abuts the inner surface 80 of the bottom wall 76 of the pocket 73 in the body member 21 of the clamp assembly 11, as shown in FIG. 6. The second end 143 of the biasing member 141 abuts the nut 17 received in the chamber 38 of the keeper 31.

The body member 21 is preferably unitarily formed as a single-piece. The body member 21 is preferably made of an aluminum alloy. The keeper 31 is preferably unitarily formed as a single-piece. The keeper 31 is preferably made of an aluminum alloy.

Assembly and Operation

The deadend clamp assembly 11 is shown assembled in FIGS. 1-7. The body member 21 is connected to a support, such as a bracket, and the clevis pin 56 is passed through the mounting ear openings 54 and 55. The cotter pin 61 is then passed through the opening 60 in the clevis pin 56 to prevent the cotter pin from being removed from the mounting ears 52 and 53. The clevis pin 56 allows the clamp assembly 11 to pivot with respect to the support, thereby facilitating receiving the cable 9.

The cable 9 is inserted in the cable groove 71 from a side of the body member (i.e., in a radial direction of the cable). The lip 70, as shown in FIG. 2, prevents the cable 9 from slipping out of the cable groove 71 as the fastener 13 is tightened to draw the keeper 31 closer to the body member 21 to clamp the cable therebetween.

The washer 16 is disposed on the shaft 15 of fastener 13 such that the washer is received by the recessed area 78 in the body member 21, as shown in FIGS. 5 and 6. To clamp the cable 9 between the body member 21 and the keeper 31, a fastener 13 is inserted through the fastener opening 77 in the body member 21 and through the bore 35 in the keeper 31. The nut 17 is disposed in the chamber 38 of the fastener portion 32 of the keeper 31 and peened in the chamber 38 to substantially prevent upward (axial) movement.

Figure 19:
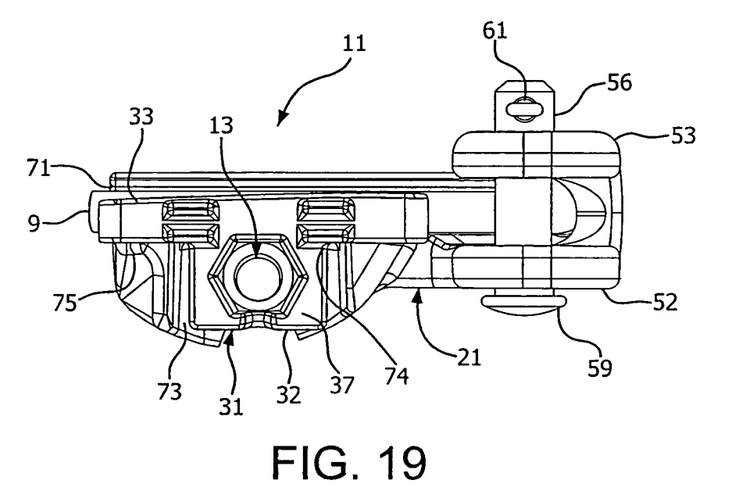
FIG. 19 is a rear elevational view of the clamp assembly of FIG. 1.

The biasing member 41 is disposed on the shaft 15 of the fastener 13 such that the biasing member is prevented from being dislodged during tightening. The fastener 13 is tightened, thereby drawing the fastener portion 32 of the keeper 31 into the pocket 73 of the body member 21. The biasing member 41 is compressed as the fastener portion 32 of the keeper 31 is drawn into the pocket 73. Simultaneously, the cable portion 33 of the keeper 31 is drawn toward the retained cable 9 in the cable groove 71. Tightening of the fastener 13 is stopped when the keeper cable groove 34 engages the cable 9, thereby clamping the cable 9 between the keeper 31 and the body member 21. The chamber 38 and the peened nut 17 substantially prevent rotation and movement of the captive nut 17 on the fastener shaft 15, thereby securely retaining the keeper 31 to the body member 21. As shown in FIGS. 3 and 19, the side walls 74 and 75 substantially prevent rotation of the keeper 31 relative to the body member 21 as the keeper 31 is drawn into the pocket 73 of the body member 21.

While an advantageous embodiment has been chosen to illustrate the invention, it will be understood by those skilled in the art that various changes and modifications may be made therein without departing from the scope of the invention as defined in the appended claims.

What is claimed is:

1. A clamp assembly, comprising:
a body member;
a cable groove with open longitudinal ends extending along a longitudinal axis and a bend of approximately 90 degrees formed in said body member to receive a cable;
a keeper connected to said body member having a lower surface movable substantially perpendicular to said longitudinal axis between said ends to engage the cable received in said cable groove such that the received cable passes completely through said body member and said keeper;
a fastener connecting said keeper to said body member; and
a biasing member disposed on said fastener and passing through a fastener bore in said keeper, a first end of said biasing member directly engaging a nut disposed on said fastener in said keeper and a second end directly engaging said body member.

2. The clamp assembly of claim 1, wherein
said fastener is threaded.

3. The clamp assembly of claim 1, wherein
said biasing member is a helical tapered spring.

4. The clamp assembly of claim 1, wherein
said nut is internally threaded and disposed in a chamber in said keeper.

5. The clamp assembly of claim 4, wherein
said nut is peened in said chamber and said chamber has a shape corresponding to said nut to substantially prevent rotational and axial movement of said nut therein.

6. The clamp assembly of claim 1, wherein
a recess is formed in said body member to receive a washer on said fastener.

7. The clamp assembly of claim 4, wherein
said biasing member has a first end having a first diameter larger than a second diameter of a second end.

8. A clamp assembly, comprising:
a body member;
a cable groove with open longitudinal ends extending along a longitudinal axis formed in said body member to receive a cable;
a keeper having a lower surface movable substantially perpendicular to said longitudinal axis between said ends to engage the cable received in said cable groove such that the received cable passes completely through said body member and said keeper;
a threaded fastener connecting said keeper to said body member;
an internally threaded nut disposed in a chamber in said keeper receiving said fastener; and
a biasing member disposed on said fastener and passing through a fastener opening in said keeper, a first end of said biasing member directly engaging said nut and a second end directly engaging said body member.

9. The clamp assembly of claim 8, wherein
said cable groove has a bend of approximately 90 degrees.

10. The clamp assembly of claim 8, wherein
said biasing member is a helical tapered spring.

11. The clamp assembly of claim 8, wherein
said nut is peened in said chamber and said chamber has a shape corresponding to said nut to substantially prevent rotational and axial movement of said nut therein.

12. The clamp assembly of claim 8, wherein
a recess is formed in said body member to receive a washer on said fastener.

13. The clamp assembly of claim 8, wherein
said biasing member has a first end having a first diameter larger than a second diameter of a second end.

14. The clamp assembly of claim 8, wherein
said keeper has a fastener portion receiving said fastener and a cable portion to engage the cable.

15. The clamp assembly of claim 8, wherein
a pocket is formed in said body member to receive said fastener portion of said keeper.

16. The clamp assembly of claim 12, wherein
said recess is substantially V-shaped.

17. The clamp assembly of claim 1, wherein
a clevis pin passes entirely through said body member to facilitate connecting said clamp assembly to a support.

18. The clamp assembly of claim 8, wherein
a clevis pin passes entirely through said body member to facilitate connecting said clamp assembly to a support.

* * * * *